United States Patent [19]

Okaniwa et al.

[11] 4,128,702

[45] Dec. 5, 1978

[54] CELL WITH N,N-BIS (SUBSTITUTED PHENYL)-4,4- DIPYRIDINIUM SALT DEPOLARIZER

[75] Inventors: Hiroshi Okaniwa, Hachioji; Toshiaki Yatabe, Hino, both of Japan

[73] Assignee: Teijin Limited, Osaka, Japan

[21] Appl. No.: 854,965

[22] Filed: Nov. 25, 1977

[51] Int. Cl.$^2$ ............................................. H01M 4/60
[52] U.S. Cl. ..................................... 429/27; 429/213
[58] Field of Search ............... 429/213, 212, 209, 201, 429/199, 206, 207, 27, 12, 232

[56] References Cited

U.S. PATENT DOCUMENTS 2,880,122  3/1959  Morehouse et al. ................. 429/201
2,993,946  7/1961  Lozier ................................. 429/213

*Primary Examiner*—Anthony Skapars
*Attorney, Agent, or Firm*—Sughrue, Rothwell, Mion, Zinn and Macpeak

[57] ABSTRACT

A half cell using a halide salt of N,N'-bis(substituted phenyl)-4,4'-dipyridyl as the cathode depolarizer has higher discharge voltage than those conventional cells using other organic compounds. Moreover, the primary cells or the secondary batteries therefrom have higher energy density and flatter discharge curves and thus they are very useful as compact and light cells or batteries. 2,4-Dinitrophenyl and 4-cyanophenyl are preferable as the substituted phenyl group.

9 Claims, No Drawings

CELL WITH N,N-BIS (SUBSTITUTED PHENYL)-4,4- DIPYRIDINIUM SALT DEPOLARIZER

BACKGROUND OF THE INVENTION

This invention relates to half-cells using organic compounds as the depolarizer. More particularly it relates to cells using halide salts of N,N'-bis(substituted phenyl)-4,4'-dipyridyl as the organic depolarizer.

As cells using organic compounds as active materials, cells comprising cathode depolarizers of organic compounds shown below have been proposed, organic nitro compounds typified by m-dinitrobenzene, azodicarbonamides typified 1,1'-azobis(N-propylformamide) and charge transfer complexes from halogens and organic compounds typified by poly-2-vinyl quinoline, poly-2-vinyl pyridine and iodine.

In the above cells comprising organic depolarizers, electrolytes containing mainly liquid ammonia or organic solvents or solid electrolytes are used since these organic depolarizers are unstable or insoluble in aqueous media. For example, in the case of a cell containing m-dinitrobenzene it utilizes advantageously the feature that m-dinitrobenzene is soluble in liquid ammonia and is said to be excellent in low-temperature performance. A special pressure vessel is necessary for holding liquid ammonia, however, the weight efficiency of the cell is small and its use is restricted in respect of safety. A cell using a charge transfer complex obtained from poly-2-vinyl quinoline, poly-2-vinyl pyridine and iodine, or an ammonium organic polyiodide has less toxicity and corrosion properties with iodine which acts as a cathode depolarizer since iodine is fixed in the form of easy-to-handle solid organic compounds mentioned above. In these cells, however, the use of a solid electrolyte or an aprotic organic solvent as the liquid electrolyte lowers the specific conductivity of the electrolyte and increases the internal resistance of the cells, which is not good for the function of the cell. Moreover, the above iodine compounds are not completely stable, which affects the shelf-life of the cells adversely.

Recently rechargeable cells (secondary batteries) using a dipyridinium salt as the depolarizer for both cathode and anode have been proposed by Kondo et al in Japanese Patent Application Laid-open No. 77830/1976, in which the dipyridinium salt is represented as follows:

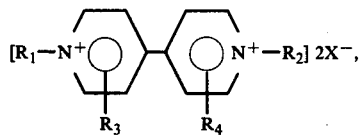

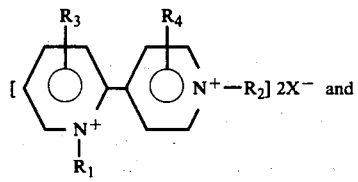

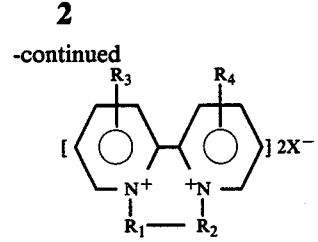

where $R_1$, $R_2$, $R_3$, $R_4$ are H, alkyl, cycloalkyl, aryl, or alkaryl, which may be substituted; $X^-$ is $Cl^-$, $Br^-$, $I^-$, $PF_6^-$, $BF_4^-$, or $ClO_4^-$. As a concrete example, however, only N,N'-bis-n-heptyl-4,4'-dipyridinium dibromide has been shown while the effect of the dipyridinium salts bearing aromatic rings such as dinitrophenyl or cyanophenyl has not yet been disclosed.

SUMMARY OF THE INVENTION

It has been found in accordance with this invention that in the cathodic mix comprising carbon, a cathode depolarizer, and an aqueous electrolyte the use of a halide salt of N,N'-bis(substituted phenyl) dipyridyl as the cathode depolarizer provides a half cell of higher discharge voltage. It has also been found in accordance with this invention that said half cell can be combined with an anode comprising a metal electrode of high electronegativity and high electrochemical reversibility and an aqueous electrolyte to form a primary, secondary or fuel cell or battery, which has higher energy density and flatter discharge curves and thus it is useful as a compact and light cell or battery. Especially, the primary cell using N,N'-bis(2,4-dinitrophenyl)-4,4'-dipyridinium dichloride or dibromide as the cathode depolarizer and the secondary cell using N,N'-bis(4-cyanophenyl)-4,4'-dipyridinium dichloride or dibromide are preferable.

DETAILED DESCRIPTION OF THIS INVENTION

Halide salts of N,N'-bis(substituted phenyl)-4,4'-dipyridyl used as the depolarizer in the present invention can be shown by following formula (1)

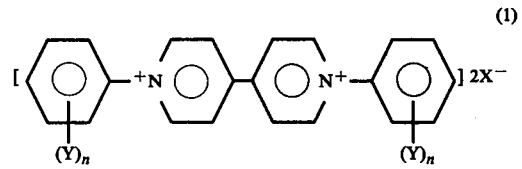

where Y is nitro or cyano group; n is 1 or 2; and $X^-$ is $Cl^-$ or $Br^-$.

The above compounds can be effectively subjected to oxidation-reduction reaction as shown in (2) and (3).

$$Ti\ P_y^{2+} + e = P_y^{+\cdot} \tag{2}$$

$$P_y^{+\cdot} + e = P_y^{\cdot\cdot} \tag{3}$$

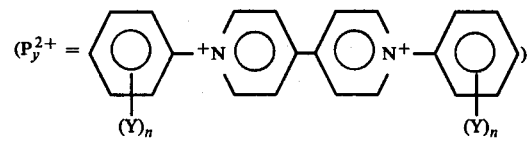

Especially halide salts of N,N'-bis(2,4-dinitrophenyl)-dipyridyl bearing easily reducible groups, which are neutral salts having the structure shown below, are preferably used as the cathode depolarizer for primary cells.

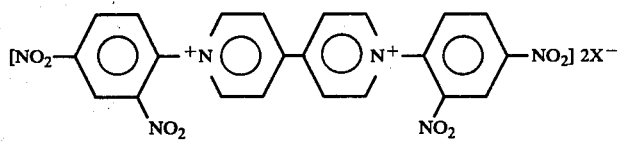

where $X^-$ is $Cl^-$ or $Br^-$. For example, its hydrochloride salt can be obtained by the reaction of 4,4'-dipyridyl with 2,4-dinitrochlorobenzene in methanol under reflux at 65° C. for 70 hrs. in the nitrogen atmosphere, which is washed with acetone and then recrystallized in distilled water, followed by drying at 90° C. under a reduced pressure. The electrolytic reduction of the above N,N'-bis(2,4-dinitrophenyl)-4,4'-dipyridinium dichloride on a platinum electrode in an ammonium chloride solution by cyclic voltammetry is supposed to proceed as shown in equation (4).

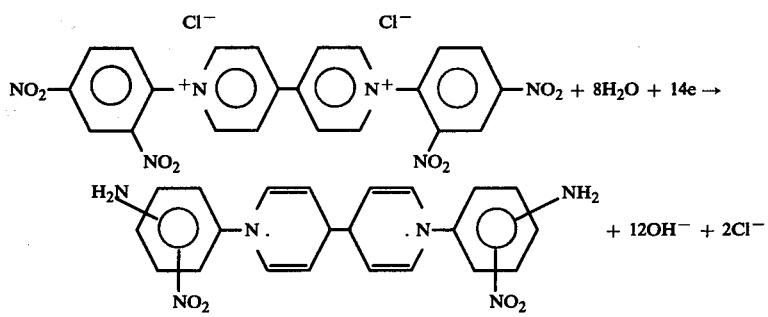

Halide salts of N,N'-bis(4-cyanophenyl)-4,4'-dipyridyl used as the cathode depolarizer in the present invention are neutral salts having the structure shown below.

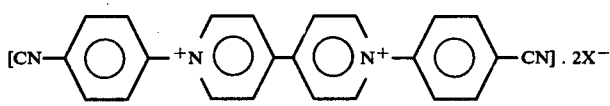

where $X^-$ is $Cl^-$ or $Br^-$.

The above compounds can be preferably used as the cathode depolarizer for secondary cells. When electrolytic reduction and oxidation of the compounds on a platinum electrode in an ammonium chloride aqueous solution is effected by means of the cyclic voltammetry, the compounds are supposed to be reversibly oxidized and reduced as shown in the equation (5) and the oxidation and reduction is thought to correspond to the discharging and the charging of the cells.

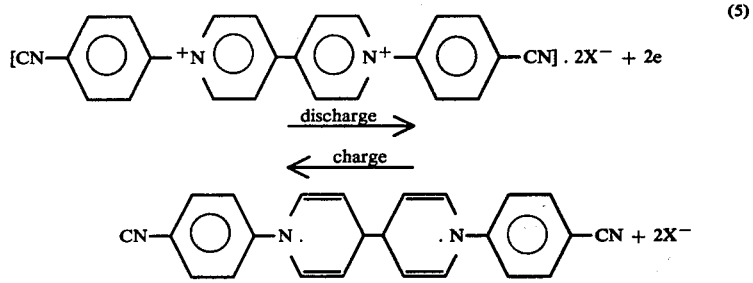

Said cathode depolarizer forms the cathodic mix (A) together with carbon and an aqueous electrolyte. The carbon increases the electric conductivity of said cathode depolarizer which is originally less conductive and acts as electron carrier when the depolarizer is reduced in the cell reaction. As said carbon, acetylene black, carbon black, graphite and activated carbon can be used individually or in combination.

The aqueous electrolyte may contain water soluble salts individually or in combination which are obtained from inorganic acids such as sulfuric, hydrohalogenic, nitric, phosphoric or perhalogenic acid or organic acids such as acetic, oxalic, citric, or tartaric acid and cations of such as ammonia, lithium, sodium, potassium, magnesium, calcium, zinc, cadmium, nickel or aluminum. Said aqueous electrolyte can be incorporated with water-soluble or water-swelling polymers such as polyvinyl alcohol, polyammonium methacrylate, polyvinyl pyrrolidone, etc., and further with other water-soluble or water-swelling compounds such as gelatin, alginates, or carboxymethyl cellulose and water-soluble polysaccharides such as starch or wheat flour.

In the present invention a half cell is prepared in combination with a dipyridyl derivative of the above formula, the above aqueous electrolyte and a collector. When the dipyridyl derivative is employed as the cathode depolarizer an electrolytic cell made of e.g., polyvinyl chloride is filled with an aqueous electrolyte prepared on the basis of the above description and a neutral compound of the dipyridyl derivative as the depolarizer is dissolved in the above aqueous electrolyte and finally a collector (B) is inserted into the resulting electrolyte to form the half cell.

The cathode collector (B) is employed for withdrawing the electrical energy from the cathodic mix comprising the above composition. As the collector (B), any electron conductors can be used excepting those chemically active on the cathode depolarizer. For example, gold, silver, metals of the palladium and platinum groups, materials obtained by supporting the above metals on a variety of substrates, carbon, and graphite electrodes can be used, with and the two latter being preferable. These cathode collectors (B) are used in any appropriate form of a rod, plate, net, or porous plate depending upon the shape of the cell.

In the present invention the above half-cell can be combined with a metal anode half cell of high electronegativity and high electrochemical reversibility to form an electrochemical cell.

As a aforementioned metal anode (C), the system having a normal electrode potential less-noble than hydrogen electrode potential can be employed and especially a zinc anode is preferable. Said metal anode comprises the metal in the pure form or in the form of an alloy thereof, for example, amalgamated zinc, which is used for raising the hydrogen overvoltage. The anode is molded in any appropriate form such as a cylinder, plate or net depending upon the shape of the cell.

In the fabrication of a cell from the cathodic mix (A), the cathode collector (B) and the highly electronegative metal anode (C), a separator which is susceptible to impregnation with the aqueous electrolyte is required so as to prevent short circuiting between the cathode and the anode in the cell and reduce the internal ohmic resistance. This separator has also a role to prevent self-discharge caused by the dissolution of the cathode depolarizer into the aqueous electrolyte until it diffuses so far as to the metal anode. As said separator, kraft paper, filter paper or cellophane film from cellulose, nonwoven cloths from inorganic fibers, such as glass fibers or asbestos, synthetic fibers such as nylon 66, or porous films such as microporous polypropylene film can be used.

A cell of the present invention fabricated by the method mentioned above, for example, when N,N'-bis(2,4-dinitrophenyl)-4,4'-dipyridinium dichloride is used as the cathode depolarizer, is supposed to undergo the reduction as shown in equation (4). The theoretical discharge capacity of the depolarizer, therefore, is 0.67 Ahr/g., which is larger than that of conventional depolarizers for primary cell use, such as manganese dioxide (0.308 Ahr/g.), mercury oxide (0.244 Ahr/g.) or silver oxide (0.434 Ahr/g.) The theoretical energy density is 0.4 Whr/g. when the zinc anode is combined therewith, and 0.84 Whr/g. in the case of the magnesium anode, which are comparable or higher as compared with conventional primary cells such as a manganese cell (0.365 Whr/g.), mercury cell (0.245 Whr/g.), or silver cell (0.47 Whr/g.). The discharge voltage is 1.2–1.3 volts when the zinc anode is used which is comparable to, for example, 1.25 volt of an m-dinitrobenzene-magnesium cell. Moreover, the magnesium cell combined with the depolarizer of the present invention can operate at the discharge voltage of 1.9–2.0, much higher than that of the above cell. Therefore, the cells of the present invention comprising the zinc anode can substitute for primary cells comprising conventional inorganic cathode depolarizers, especially a mercury cell and silver cell. The cell using the magnesium anode can be used as a "sea water battery" of high-voltage and high energy density.

In the present invention N,N'-bis(p-cyanophenyl)4,4'-dipyridinium dichloride can be preferably used as the catode depolarizer for secondary cells or batteries. The above depolarizer is supposed to react electrochemically according to equation (5) in charge and discharge cycles. The depolarizer has the theoretical discharge capacity of 0.13 Ahr/g. and the cells or batteries have a theoretical energy density of 0.13 Whr/g. when used in combination with the zinc anode, an open circuit voltage of 1.2–1.3 and a discharge voltage of 1.0–1.2. These excellent performances show the possibility of compact and light cells or batteries, which can substitute for a conventional Ni-Cd battery.

The merits of the cells or batteries comprising the depolarizers of the present invention can be shown as follows:

(1) Their oxidation-reduction potentials are relatively noble and combinations thereof with the zinc anodes give an electromotive force of about 1.1–1.3 volts.

(2) The lightness of the depolarizer is effective to enhance the weight efficiency of the fabricated cells.

(3) They have relatively high energy density and flatter discharge curves.

(4) The depolarizers can be synthesized and thus they are free of resource problems unlike lead secondary batteries and silver cells.

EXAMPLE 1

(1) Preparation of N,N'-bis(2,4-dinitrophenyl)-4,4'-dipyridinium dichloride (hereinafter abbreviated as $DNP^{2+}$)

150 g. of 2,4-dinitrochlorobenzene and 300 ml. of methanol were placed in a 1-liter three necked flask and heated in a nitrogen atmosphere under slow stirring to reflux at the boiling point of methanol. A dropping funnel containing 47 g. of 4,4'-dipyridyl dissolved in 120 ml. of methanol was connected with the above flask and the dipyridyl solution was added to the flask for about 1 hour. After the completion of the addition the reflux was continued for 72 hours at the boiling point of methanol under slow stirring. The reaction mixture was cooled to room temperature in the flask and then filtered. The precipitate was washed with acetone until the wash solvent showed a pale yellow color. After air drying, the precipitate was dissolved in sufficient demineralized water to dissolve the precipitate at the boiling point to effect recrystallization. After the filtration the resulting crystals were dried under reduced pressure at 80° C. for 10 hours to give 64 g. of $DNP^{2+}$.

(2) Half cell comprising $DNP^{2+}$ as a depolarizer 0.2 g. of $DNP^{2+}$ was dissolved in 40 ml. of 20 wt.% ammonium chloride aqueous solution which was acidified with hydrochloric acid. An H-shaped electrolytic cell which was made of glass and divided with an ion exchange membrane (the cross section was 10 cm²) was filled with the above solution and a carbon rod of 8 mm in diameter (the electrode area was 10 cm$^2$) was inserted thereinto as the collector to form the half cell.

(3) Primary cell

The fabrication of the cell comprising DNP$^{2+}$ as a depolarizer and Zn

Anode: Zn plate (of 99.9% purity)
Cathode collector: carbon rod
Cathodic mixes: (three of (a), (b), and (c))

10 g. of a powder mixture consisting of 20 wt.% of DNP$^{2+}$ and 80 wt.% of acetylene black was mixed with
(a) 350 g./l NH$_4$Cl aqueous solution containing starch
(b) 400 g./l citric acid and 200 g./l NH$_4$Cl aqueous solution containing starch
(c) 75 g./l hydrochloric acid and 200 g./l NH$_4$Cl aqueous solution containing starch respectively to form pasty mixtures.

Separator: filter paper Discharge characteristics of the above cells in discharge through external loads of 600, 60, and 23 ohms for 60 minutes are shown in Table 1.

Table 1

| Cathodic Mix | Open Circuit Voltage | External loads (ohm) | 600 | 60 | 23 |
|---|---|---|---|---|---|
| | | A.D.V. | 1.16 | 1.06 | 0.93 |
| (a) | 1.29 | A.D.C. | 1.94 | 17.7 | 40.6 |
| | | Q.D.E. | 6.99 | 63.6 | 146 |
| | | A.D.V. | 1.24 | 1.17 | 1.07 |
| (b) | 1.41 | A.D.C. | 2.01 | 19.8 | 46.4 |
| | | Q.D.E. | 7.45 | 71.2 | 167 |
| | | A.D.V. | 1.27 | 1.26 | 1.19 |
| (c) | 1.39 | A.D.C. | 2.12 | 21.1 | 51.7 |
| | | Q.D.E. | 7.62 | 75.8 | 186 |

Discharge characteristics of DNP$^{2+}$ depolarizer - Zn cell. Discharge characteristics under a variety of external loads.

A.D.V.: Average discharge voltage in volts
A.D.C.: Average discharge current in milliamperes
Q.D.E.: Quantity of discharged electricity in coulombs Conventional cells comprising a combination of other organic compounds as a cathode depolarizer and zinc anodes have low discharge voltage, which limits their use, while cells comprising DNP$^{2+}$ of a present invention show the discharge voltage of 093-1.19 volts even under an external load of 23 ohms, which is comparable to that of the zinc — mercury cell.

EXAMPLE 2

A magnesium cell comprising DNP$^{2+}$ as the cathode depolarizer was fabricated using components shown below:

Anode: magnesium plate (of 99% purity)
Cathode collector: carbon rod (6 mm in diameter)
Cathodic mix: 10 g. of a powder mixture consisting of 20 wt.% of DNP$^{2+}$ and 80 wt.% of acetylene black as mixed with 200 g./l of MgBr$_2$ aqueous solution containing starch to form a pasty mixture.
Separator: cellophane film Table 2 shows the discharge characteristics of the above cell when it was connected with external loads of 500, 60, and 23 ohms respectively.

Table 2

Discharge characteristics of DNP$^{2+}$ depolarizer - Mg cell

| O.C.V. | E.L. | 500 | 60 | 23 |
|---|---|---|---|---|
| | A.D.V. | 1.65 | 1.53 | 1.41 |
| 1.85 | A.D.C. | 3.3 | 25.5 | 60 |

Table 2.—continued

Discharge characteristics of DNP$^{2+}$ depolarizer - Mg cell

| O.C.V. | E.L. | 500 | 60 | 23 |
|---|---|---|---|---|
| | Q.D.E. | 11.9 | 91.8 | 219 |

As shown in Table 2, the DNP$^{2+}$ — magnesium cell has high initial discharge voltage and flatter discharge curves.

EXAMPLE 3

DNP$^{2+}$ — Zn cells were prepared using the cathodic mixes shown below:

Anode: Zn plate (of 99% purity)
Cathode collector: carbon rod (6 mm in diameter)
Cathodic mixes: 10 g. of a mixture consisting of 20 wt.% of DNP$^{2+}$ and 80 wt.% of acetylene black was mixed with
(a) 350 g./l NH$_4$Cl aqueous solution containing starch
(b) 75 g./l HCl + 200 g./l NH$_4$Cl aqueous solution containing starch Separator: filter paper These cells had initial voltages of (a) 1.27 volts and (b) 1.24 volts respectively and the theoretical discharge capacity was 4820 coulombs calculated on the DNP$^{2+}$ basis.

The continuous discharge was conducted by connecting these cells with external loads shown in Table 3.

Table 3

Characteristics in the continuous discharge of DNP$^{2+}$- Zn cell

| | Initial voltage (volt) | External load (ohm) | Discharge time to end voltage of 0.7 volt (hours) | Q.D.E. (coulomb) | Coefficient of use of DNP |
|---|---|---|---|---|---|
| (a) | 1.02 | 21.7 | 8 | 1,123 | 23.4% |
| (b) | 1.14 | 60.0 | 40 | 2,163 | 60.6 |

Cell (b) was employed for discharge under external loads of 500, 60, and 23 ohms for 1 hour, respectively, similar to example 1 prior to the above continuous discharge. Therefore, the quantity of discharged electricity was 2163 + 755 = 2918 coulombs in total.

EXAMPLE 4

A DNP$^{2+}$ - Mg cell for a continuous discharge experiment was prepared using the components as follows:

Anode: Mg plate (of 99.9% purity)
Cathode collector: carbon rod (6 mm in diameter)
Cathodic mix: 2 g. of a powder mixture of 20 wt.% of DNP$^{2+}$ and 80 wt.% of acetylene black was mixed with an aqueous electrolyte mixture of NaCl + MgCl$_2$.6H$_2$O
Separator: cellophane film The above cell had initial voltage of 1.98 volts and a theoretical discharge capacity of 963 coulombs calculated on the DNP$^{2+}$ basis.

Continuous discharge for 100 hours was conducted by connecting the cell with an external load of 100 ohms. The average discharge voltage was 1.25 volts and the end voltage of discharge after 12 hours dropped to 0.9 volt. The quantity of electricity withdrawn to the external circuit was 540 coulombs, which corresponds to 55% of the theoretical discharge capacity of DNP$^{2+}$.

The merits of the cells using $DNP^{2+}$ of the present invention as the depolarizer can be summarized by items as follows:

(1) The discharge voltage of said cells is higher than that of other cells comprising conventional organic depolarizers. Therefore, primary cells are obtainable in combination with the Zn anode.

(2) Said cells have higher energy density and flatter discharge curves. Thus they can give compact and light primary cells suitable for the requirement of portable electronic appliances.

(3) Higher discharge voltage than that of conventional "Sea-water batteries" is obtainable in combination with the magnesium anode and thus high energy density cells can be provided.

(4) Said depolarizers are synthetically obtainable and free of such resource problems as presented by mercury or silver.

EXAMPLE 5

(1) A half cell using N,N'-bis(p-cyanophenyl)-4,4'-dipyridinium dichloride (hereinafter abbreviated as $CPP^{2+}$) as one of the dipyridyl derivatives 0.6 g. of $CPP^{2+}$ was dissolved in 120 ml. of 20 wt.% ammonium chloride aqueous solution which had been acidified with hydrochloric acid. An H-shaped electrolytic cell which was made of transparent polyvinyl chloride and divided with an ion exchange membrane (40 cm$^2$ cross sectional area) was filled with the above aqueous electrolyte and a graphite plate (the size of the electrode was 5 × 8 cm) was inserted thereinto as the collector to form the half cell.

(2) A secondary cell using $CPP^{2+}$ as the depolarizer

Subsequently, the anode area of the above H-shaped cell was filled with 120 ml. of 20 wt.% ammonium chloride aqueous solution and a Zn metal plate (the size of the electrode was 5 × 8 cm) was inserted thereinto as the collector/anode depolarizer to form the secondary cell. The open circuit voltage of this secondary cell was 1.08 volts. The discharge under the external load of 50 ohms for 1 hour showed the flat discharge characteristics of the terminal voltage of 0.95 and a discharge current of 20 milliamperes. As the discharge proceeded, $CPP^{2+}$ was reduced to the dark green radical cation ($CPP^{+}$) formed on the surface of the graphite collector. The internal resistance of the cell measured by means of the alternating current bridge method was 0.6 ohm, showing no change before and after the discharge.

After the discharge the cell was connected with an external direct current power source to have $CPP^{+}$ deposited on the surface of the graphite collector oxidized electrochemically to $CPP^{2+}$ again, which accordingly dissolved in the cathode area, while Zn metal dissolved in the cell during the discharge was deposited on the Zn collector. Thus, after the charge the repetition of the discharge under the same condition gave the discharge characteristics similar to those of the proceeding discharge.

The cells using half cells of $CPP^{2+}$ as the depolarizer are, as shown clearly the this example, simple in the structure and easy to fabricate. Moreover, the cells have excellent discharge characteristics and outstanding reversibility, which shows clearly that they may be used as a secondary battery.

EXAMPLE 6

Preparation of a $CPP^{2+}$ — Zn secondary cell
Anode: Zn plate (of 99.9% purity)
Cathode collector: carbon rod
Cathodic mixes: 10 g. of a powder mixture of 50 wt.% of $CPP^{2+}$ and 50 wt.% of acetylene black was kneaded with
 (a) 350 g./l $NH_4Cl$ aqueous solution containing starch
 (b) 300 g./l $NH_4Cl$ + 120 g./l $ZnCl_2$ aqueous solution containing starch
Separator: kraft paper The discharge characteristics when these cells were connected with external loads of 600, 60, and 23 ohms respectively, after discharging for 60 minutes, are shown in Table 4.

Table 4

| Cathodic mixtures | Open circuit voltage | Discharge characteristics under a variety of external loads | | |
|---|---|---|---|---|
| | | External load | 600 | 60 | 23 |
| (a) | 1.18 volt | A.D.V. (volt) | 1.11 | 1.03 | 0.88 |
| | | A.D.C. (mA) | 1.85 | 17.1 | 38.3 |
| | | Q.D.E. (C) | 6.66 | 61.8 | 138 |
| (b) | 1.15 volt | A.D.V. (volt) | 1.08 | 1.01 | 0.86 |
| | | A.D.C. (mA) | 1.8 | 16.8 | 37.4 |
| | | Q.D.E. (C) | 6.48 | 60.6 | 135 |

The total of discharged electricity was 206 coulombs in (a) and 202 coulombs in (b), respectively. The cells using conventional organic active material as the cathode depolarizer have low discharge voltage, which limits their use, while the discharge voltage of the cell using $CPP^{2+}$ of the present invention as the cathode depolarizer is relatively high and comparable to that of the conventional mercury - zinc cell.

These cells having the respective cathodic mixture of (a) and (b) were charged with electricity in an amount of 400 coulombs and were then discharged alike through 600, 60, and 23 ohm resistors. These charge-discharge cycles were repeated 20 times. The total of discharged electricity of these cells (a) and (b) at the 20th cycle was (a) 187 coulombs and (b) 189 coulombs respectively.

EXAMPLE 7

A $CPP^{2+}$ — Zn secondary cell was fabricated from the components shown below and the charge - discharge cycle was repeated continuously.

Anode: Zn can
Cathode collector: carbon rod (6 mm in diameter)
Cathodic mixes: 10 g. of a powder mixture of 50 wt.% of $CPP^{2+}$ and 50 wt.% of acetylene black was mixed with
 (a) 350 g./l $NH_4Cl$ aqueous solution containing starch
 (b) 300 g./l $NH_4Cl$ + 120 g./l $ZnCl_2$ aqueous solution containing starch to form a pasty mixture
Separator: kraft paper These cells had the initial voltages and the internal resistances, (a) 1.20 volts, 0.5 ohm; (b) 1.17 volts, 0.4 ohm, respectively. Their theoretical discharge capacity was 2200 coulombs calculated on the $CPP^{2+}$ basis.

These cells were discharged through an external load of 60 ohms by 500 coulombs and then charged by 750 coulombs. This cycle was repeated. Peterioration was not observed until 50 repetitions and the terminal voltage dropped below 0.7 volt after 73 repetitions in (a) and 68 repetitions in (b).

EXAMPLE 8

A cell was fabricated using the same components as in example 7 - (a). The cell had an initial voltage and internal resistance of 1.18 volts and 0.4 ohm, respectively. The cell was discharged through an external load of 23 ohms to a terminal voltage of 0.5 volt and then charged with electricity 1.5-2 times that of the discharge and this cycle was repeated. The deteriorations of the cell was observed after about 35 repetitions and 46-time repetition the discharge reduced to less than 50% of the initial quantity.

The merits of half cells using $CPP^{2+}$ of the present invention as the depolarizer can be summarized by items as follows:

(1) Said cells have a higher discharge voltage than that of conventional cells using other organic compounds and longer shelf life. Therefore, a secondary battery is obtainable in combination thereof with the Zn anode.

(2) Said cells have higher energy density and flatter discharge curves. Therefore they can provide primary or secondary cells with compactness and lightness to meet the requirements of portable electronic appliances.

What we claim is:

1. In a half-cell using a cathode composition which comprises a mixture of carbon, a depolarizing compound and an electrolyte, the improvement wherein the depolarizing compound has the formula:

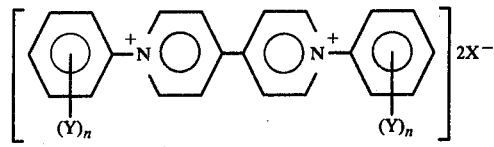

in which Y is selected from the group consisting of nitro and cyano groups; n is 1 or 2; and $X^-$ is $Cl^-$ or $Br^-$.

2. The half-cell as defined in claim 1 wherein said depolarizing compound is N,N'-bis(2,4-dinitrophenyl)-4,4'-dipyridyl dichloride or dibromide.

3. The half-cell as defined in claim 1 wherein said depolarizing compound is N,N'-bis(4-cyanophenyl)-4,4'-dipyridyl dichloride or dibromide.

4. In a cell comprising an anode of a highly electropositive metal and a cathode composition which comprises a mixture of carbon, a depolarizing compound and an electrolyte, the improvement wherein the depolarizing compound has the formula:

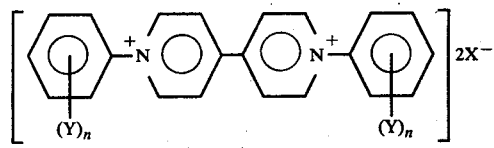

in which Y is selected from the group consisting of nitro and cyano groups; n is 1 or 2; and $X^-$ is $Cl^-$ or $Br^-$.

5. The cell as defined in claim 4 wherein said cell is a primary cell.

6. The primary cell as defined in claim 5 wherein the depolarizing compound is N,N'-bis(2,4-dinitrophenyl)-4,4'-dipyridyl dichloride or dibromide.

7. The secondary cell as defined in claim 8 wherein the depolarizing compound is N,N'-bis(4-cyanophenyl)-4,4'-dipyridyl dichloride or dibromide.

8. The cell as defined in claim 4 wherein said cell is a secondary cell.

9. The cell is defined in claim 4 wherein said cell is a fuel cell.

* * * * *